United States Patent
Kamijo et al.

(10) Patent No.: US 8,718,851 B2
(45) Date of Patent: May 6, 2014

(54) CONTROL DEVICE FOR HYBRID VEHICLE, CONTROL METHOD FOR HYBRID VEHICLE, AND HYBRID VEHICLE

(75) Inventors: Yusuke Kamijo, Toyota (JP); Hideaki Yaguchi, Toyota (JP); Daisuke Itoyama, Toyota (JP); Keisuke Morisaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/700,881

(22) PCT Filed: Jun. 10, 2010

(86) PCT No.: PCT/JP2010/059812
§ 371 (c)(1),
(2), (4) Date: Nov. 29, 2012

(87) PCT Pub. No.: WO2011/155037
PCT Pub. Date: Dec. 15, 2011

(65) Prior Publication Data
US 2013/0079969 A1    Mar. 28, 2013

(51) Int. Cl.
*B60L 9/00* (2006.01)
(52) U.S. Cl.
USPC .......................................................... 701/22
(58) Field of Classification Search
CPC .......... B60L 9/00; B60L 11/00; B60W 20/00; G06F 7/00; G06F 19/00; G06G 7/70; G05D 1/00
USPC ........................................... 701/22, 36, 69, 99
See application file for complete search history.

(56) References Cited

U.S. PATENT DOCUMENTS

| | | | |
|---|---|---|---|
| 2002/0019687 A1 | 2/2002 | Suzuki et al. | |
| 2007/0298928 A1 | 12/2007 | Yamanaka et al. | |
| 2010/0268434 A1* | 10/2010 | Hugenroth et al. | 701/102 |
| 2010/0292880 A1* | 11/2010 | McGrogan et al. | 701/22 |

FOREIGN PATENT DOCUMENTS

| | | |
|---|---|---|
| JP | 2002 47963 | 2/2002 |
| JP | 2006 94626 | 4/2006 |
| JP | 2006 321466 | 11/2006 |
| JP | 2009 154724 | 7/2009 |
| JP | 2009 248732 | 10/2009 |

OTHER PUBLICATIONS

International Search Report Issued Jul. 20, 2010 in PCT/JP10/59812 filed Jun. 10, 2010.

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

First output power is set in accordance with operation by a driver. In addition, second output power greater than the first output power is set. A hybrid vehicle is controlled so that an engine is driven in accordance with the second output power. The hybrid vehicle is controlled so that the engine is stopped when the first output power is equal to or smaller than an engine stop threshold value.

7 Claims, 12 Drawing Sheets

CONTROL DEVICE FOR HYBRID VEHICLE, CONTROL METHOD FOR HYBRID VEHICLE, AND HYBRID VEHICLE

TECHNICAL FIELD

The present invention relates to a control device for a hybrid vehicle, a control method for a hybrid vehicle, and a hybrid vehicle, and more particularly to a technique of controlling a hybrid vehicle so that an internal combustion engine mounted thereon is stopped.

BACKGROUND ART

Hybrid vehicles incorporating an electric motor as a driving source in addition to an internal combustion engine are known. In such hybrid vehicle, when the vehicle speed is low, for example, the internal combustion engine is stopped and only the electric motor can be used for running. The internal combustion engine is started when the accelerator position becomes larger, for example. It is desired to drive the internal combustion engine with high thermal efficiency.

Japanese Patent Laying-Open No. 2006-94626 (PTL 1) discloses in paragraph 0034 and the like that an engine is driven when requested power that is set based on the accelerator position is equal to or greater than a threshold value. Japanese Patent Laying-Open No. 2006-94626 also discloses in paragraph 0036 and the like that the engine is operated based on the requested power that is reset to increase by a compatible value which is set to increase overall efficiency.

CITATION LIST

Patent Literature

PTL 1: Japanese Patent Laying-Open No. 2006-94626

SUMMARY OF INVENTION

Technical Problem

However, if requested power is set to increase after an internal combustion engine has been started, it is difficult for the requested power to become smaller than a threshold value used to determine whether or not to stop the internal combustion engine. This may lower the frequency with which the internal combustion engine is stopped and only an electric motor is used for the running of a hybrid vehicle.

An object of the present invention is to increase the frequency with which an internal combustion engine is stopped.

Solution to Problem

A control device for a hybrid vehicle which includes an internal combustion engine, an electric motor, and a power storage device that stores electric power to be supplied to the electric motor, and which runs using at least one of the internal combustion engine and the electric motor includes means for setting first output power in accordance with operation by a driver, means for setting second output power greater than the first output power, means for controlling the internal combustion engine to drive in accordance with the second output power, and stop means for stopping the internal combustion engine when the first output power is equal to or smaller than a predetermined threshold value.

A control method for a hybrid vehicle which includes an internal combustion engine, an electric motor, and a power storage device that stores electric power to be supplied to the electric motor, and which runs using at least one of the internal combustion engine and the electric motor includes the steps of setting first output power in accordance with operation by a driver, setting second output power greater than the first output power, controlling the internal combustion engine to drive in accordance with the second output power, and stopping the internal combustion engine when the first output power is equal to or smaller than a predetermined threshold value.

A hybrid vehicle which includes an internal combustion engine, an electric motor, and a power storage device that stores electric power to be supplied to the electric motor, and which runs using at least one of the internal combustion engine and the electric motor includes an operation unit operated by a driver, and a control unit that controls the hybrid vehicle in accordance with the operation on the operation unit by the driver. The control unit sets first output power in accordance with the operation by the driver, sets second output power greater than the first output power, controls the internal combustion engine to drive in accordance with the second output power, and stops the internal combustion engine when the first output power is equal to or smaller than a predetermined threshold value.

Advantageous Effects of Invention

When the first output power is equal to or smaller than the predetermined threshold value, the hybrid vehicle is controlled so that the internal combustion engine is stopped. The first output power is smaller than the second output power. Thus, the first output power is more likely than the second output power to become equal to or smaller than the threshold value. Therefore, the frequency with which the internal combustion engine is stopped is increased.

DESCRIPTION OF EMBODIMENTS

Figure 1:
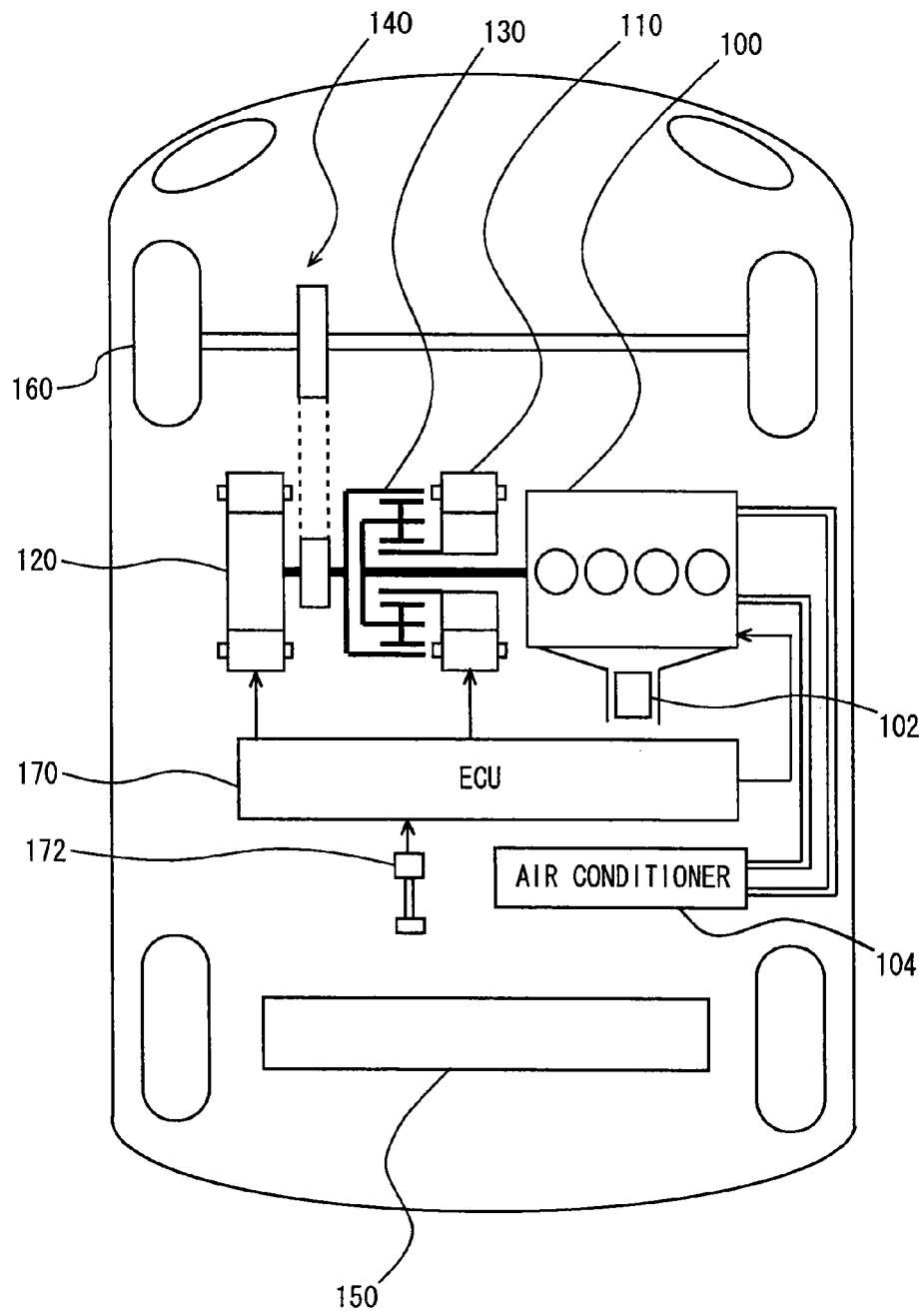
FIG. 1 is a schematic structural diagram showing a hybrid vehicle.

Embodiments of the present invention will be described below with reference to the drawings. In the following description, the same parts are denoted with the same reference numerals. Their designations and functions are also the same. Therefore, a detailed description thereof will not be repeated.

Referring to FIG. 1, a hybrid vehicle incorporates an engine 100, a first motor generator 110, a second motor generator 120, a power split device 130, a reduction gear 140, and a battery 150. Although a hybrid vehicle that does not have a charge function from an external power supply is described by way of example in the following description, a plug-in hybrid vehicle that has a charge function from an external power supply may be used.

Engine 100, first motor generator 110, second motor generator 120 and battery 150 are controlled by an ECU (Electronic Control Unit) 170. ECU 170 may be divided into a plurality of ECUs.

This vehicle runs using a driving force from at least one of engine 100 and second motor generator 120. That is, either one or both of engine 100 and second motor generator 120 are automatically selected as a driving source depending on the drive state.

For example, engine 100 and second motor generator 120 are controlled in response to a result of operation on an accelerator pedal 172 by a driver. The amount of operation on accelerator pedal 172 (accelerator position) is detected by an accelerator position sensor (not shown).

When the accelerator position is small and when the vehicle speed is low, for example, the hybrid vehicle runs using only second motor generator 120 as a driving source. In this case, engine 100 is stopped. However, engine 100 may be driven for power generation, for example.

When the accelerator position is large, when the vehicle speed is high, or when an SOC (State Of Charge) of battery 150 is low, for example, engine 100 is driven. In this case, the hybrid vehicle runs using only engine 100, or both of engine 100 and second motor generator 120, as a driving source.

Engine 100 is an internal combustion engine. An air-fuel mixture is burned in a combustion chamber to rotate a crankshaft serving as an output shaft. Exhaust gas emitted from engine 100 is cleaned by a catalyst 102, and then emitted to the outside of the vehicle. Catalyst 102 performs a cleaning function when warmed up to a specific temperature. Catalyst 102 is warmed up by heat of the exhaust gas. Catalyst 102 is a three-way catalyst, for example.

Coolant of engine 100 circulates by passing through an air conditioner 104 mounted on the hybrid vehicle. Air conditioner 104 heats the air in the vehicle interior by using the coolant of engine 100. More specifically, the coolant introduced into a heater core and the air exchange heat, to deliver warmed air into the vehicle interior. A well-known common technique can be utilized for air conditioner 104, and thus a detailed description thereof will not be repeated.

Engine 100, first motor generator 110 and second motor generator 120 are connected via power split device 130. Motive power generated by engine 100 is split into two paths by power split device 130. One of them is a path for driving front wheels 160 via reduction gear 140. The other is a path for driving first motor generator 110 to generate electric power.

First motor generator 110 is a three-phase alternating current rotating electric machine including a U-phase coil, a V-phase coil and a W-phase coil. First motor generator 110 generates electric power using motive power of engine 100 that is split by power split device 130. The electric power generated by first motor generator 110 is used depending on the running state of the vehicle or the SOC of battery 150. For example, during normal running, electric power generated by first motor generator 110 is directly used as electric power for driving second motor generator 120. On the other hand, when the SOC of battery 150 is lower than a predetermined value, electric power generated by first motor generator 110 is converted from alternating current into direct current by an inverter described later. Thereafter, the voltage is adjusted by a converter described later, and stored in battery 150.

When first motor generator 110 acts as a power generator, first motor generator 110 generates negative torque. The negative torque as used herein refers to such torque that becomes a load on engine 100. When first motor generator 110 receives power supply and acts as a motor, first motor generator 110 generates positive torque. The positive torque as used herein refers to such torque that does not become a load on engine 100, that is, such torque that assists in rotation of engine 100. This is applicable to second motor generator 120.

Second motor generator 120 is a three-phase alternating current rotating electric machine including a U-phase coil, a V-phase coil and a W-phase coil. Second motor generator 120 is driven by at least one of electric power stored in battery 150 and electric power generated by first motor generator 110.

The driving force from second motor generator 120 is transmitted to front wheels 160 via reduction gear 140. Accordingly, second motor generator 120 assists engine 100, or allows the vehicle to run with the driving force from second motor generator 120. The rear wheels may be driven instead of or in addition to front wheels 160.

During regenerative braking of the hybrid vehicle, second motor generator 120 is driven by front wheels 160 via reduction gear 140, causing second motor generator 120 to operate as a power generator. Accordingly, second motor generator 120 operates as a regenerative brake for converting braking energy into electric power. The electric power generated by second motor generator 120 is stored in battery 150.

Power split device 130 is formed of a planetary gear including a sun gear, pinion gears, a carrier, and a ring gear. The pinion gears are engaged with the sun gear and ring gear. The carrier supports the pinion gears so that they are rotatable on their own axes. The sun gear is coupled to the rotation shaft of first motor generator 110. The carrier is coupled to the crankshaft of engine 100. The ring gear is coupled to the rotation shaft of second motor generator 120 and reduction gear 140.

Since engine 100, first motor generator 110 and second motor generator 120 are coupled via power split device 130 formed of the planetary gear, the rotational speeds of engine 100, first motor generator 110 and second motor generator 120 have the relation represented by a straight line in an alignment chart.

Battery 150 is a battery pack configured so that a plurality of battery modules, each formed by integrating a plurality of battery cells, are connected in series. Battery 150 has a voltage of about 200 V, for example. Battery 150 is charged with electric power supplied from first motor generator 110 and second motor generator 120, as well as from a power supply outside of the vehicle. A capacitor may be used instead of or in addition to battery 150.

Figure 2:
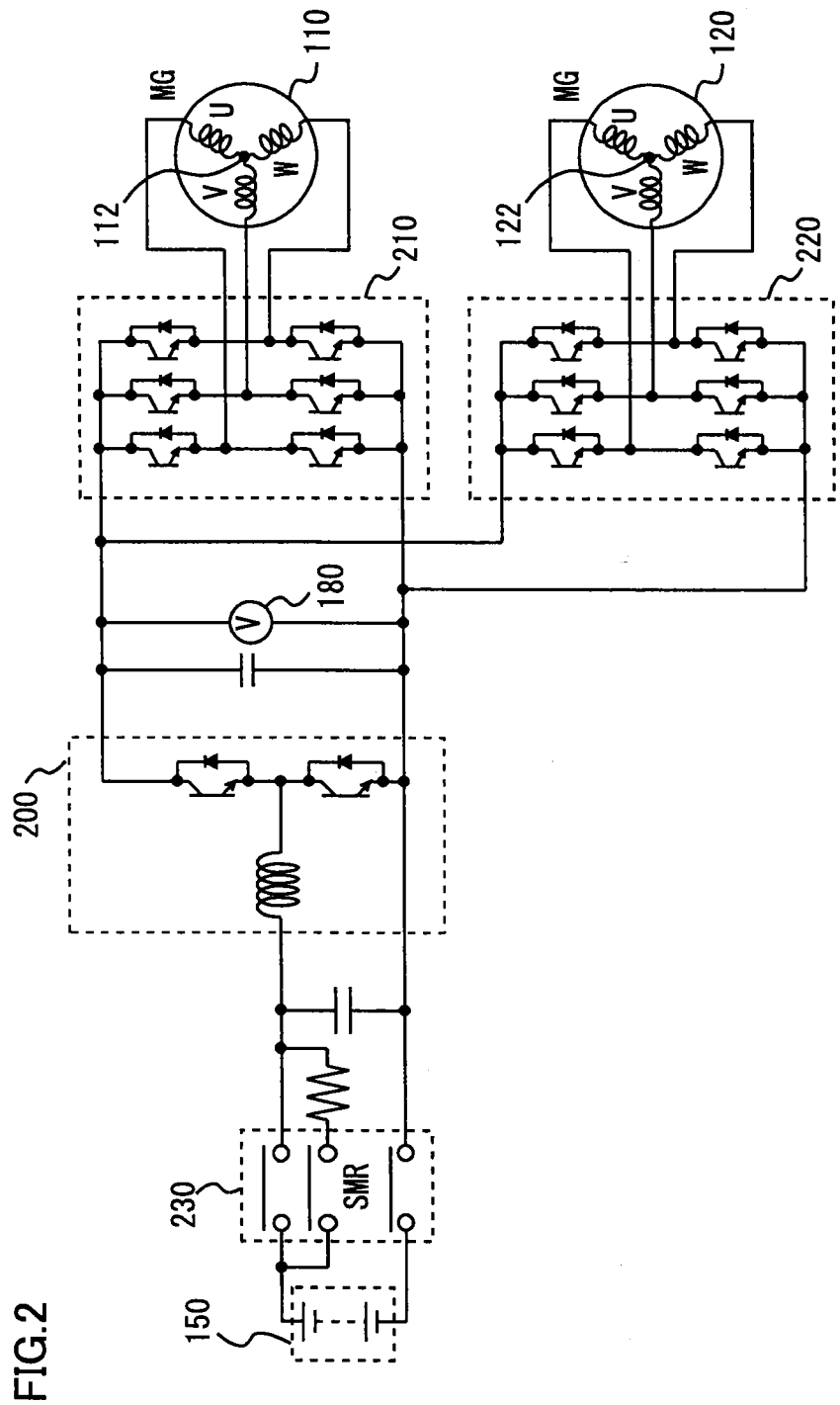
FIG. 2 shows an electrical system of the hybrid vehicle.

Referring to FIG. 2, an electrical system of the hybrid vehicle is further described. The hybrid vehicle includes a converter 200, a first inverter 210, a second inverter 220, and a system main relay 230.

Converter 200 includes a reactor, two npn transistors, and two diodes. The reactor has one end connected to the positive electrode side of each battery, and the other end connected to a node between the two npn transistors.

The two npn transistors are connected in series. The npn transistors are controlled by ECU 170. A diode is connected between the collector and the emitter of each npn transistor to allow current to flow from the emitter side to the collector side.

As the npn transistor, an IGBT (Insulated Gate Bipolar Transistor) can be used, for example. Instead of the npn transistor, a power switching element such as a power MOSFET (Metal Oxide Semiconductor Field-Effect Transistor) can be used.

When electric power discharged from battery 150 is supplied to first motor generator 110 or second motor generator 120, the voltage is boosted by converter 200. Conversely, when electric power generated by first motor generator 110 or second motor generator 120 is charged to battery 150, the voltage is decreased by converter 200.

A system voltage VH between converter 200 and each inverter is detected by a voltage sensor 180. The detection result from voltage sensor 180 is sent to ECU 170.

First inverter 210 includes a U-phase arm, a V-phase arm and a W-phase arm. The U-phase arm, V-phase arm and W-phase arm are connected in parallel. The U-phase arm, V-phase arm and W-phase arm each have two npn transistors connected in series. A diode is connected between the collector and the emitter of each npn transistor to allow current to flow from the emitter side to the collector side. Then, the node between the npn transistors in each arm is connected to an end different from a neutral point 112 of each coil of first motor generator 110.

First inverter 210 converts direct current supplied from battery 150 into alternating current, and supplies the alternating current to first motor generator 110. First inverter 210 also converts alternating current generated by first motor generator 110 into direct current.

Second inverter 220 includes a U-phase arm, a V-phase arm and a W-phase arm. The U-phase arm, V-phase arm and W-phase arm are connected in parallel. The U-phase arm, V-phase arm and W-phase arm each have two npn transistors connected in series. A diode is connected between the collector and the emitter of each npn transistor to allow current to flow from the emitter side to the collector side. Then, the node between the npn transistors in each arm is connected to an end different from a neutral point 122 of each coil of second motor generator 120.

Second inverter 220 converts direct current supplied from battery 150 into alternating current, and supplies the alternating current to second motor generator 120. Second inverter 220 also converts alternating current generated by second motor generator 120 into direct current.

Converter 200, first inverter 210 and second inverter 220 are controlled by ECU 170.

System main relay 230 is provided between battery 150 and converter 200. System main relay 230 is a relay for switching between a state in which battery 150 and the electrical system are connected and a state in which they are cut off. When system main relay 230 is in an opened state, battery 150 is cut off from the electrical system. When system main relay 230 is in a closed state, battery 150 is connected to the electrical system.

The state of system main relay 230 is controlled by ECU 170. For example, when ECU 170 is activated, system main relay 230 is closed. When ECU 170 is stopped, system main relay 230 is opened.

Figure 3:
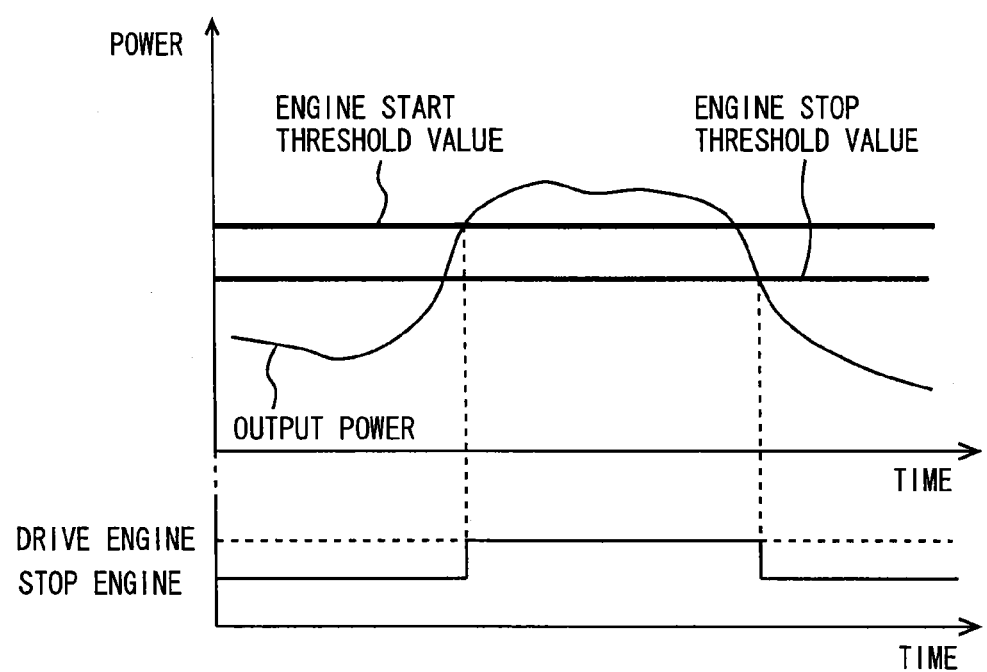
FIG. 3 shows time periods during which an engine is driven and stopped, respectively.

Referring to FIG. 3, a manner in which engine 100 is controlled is further described. As shown in FIG. 3, when output power of the hybrid vehicle is smaller than an engine start threshold value, the hybrid vehicle runs using only the driving force from second motor generator 120.

The output power is set as power used for running of the hybrid vehicle. The output power is calculated by ECU 170 in accordance with a map having the accelerator position, vehicle speed and the like as parameters, for example. It is noted that the way to calculate the output power is not limited thereto. It is noted that torque, acceleration, driving force, accelerator position or the like may be used instead of the output power.

When the output power of the hybrid vehicle becomes equal to or greater than the engine start threshold value, engine 100 is driven. Accordingly, the hybrid vehicle runs using the driving force from engine 100 in addition to or instead of the driving force from second motor generator 120. In addition, electric power generated by first motor generator 110 using the driving force from engine 100 is directly supplied to second motor generator 120.

Figure 4:
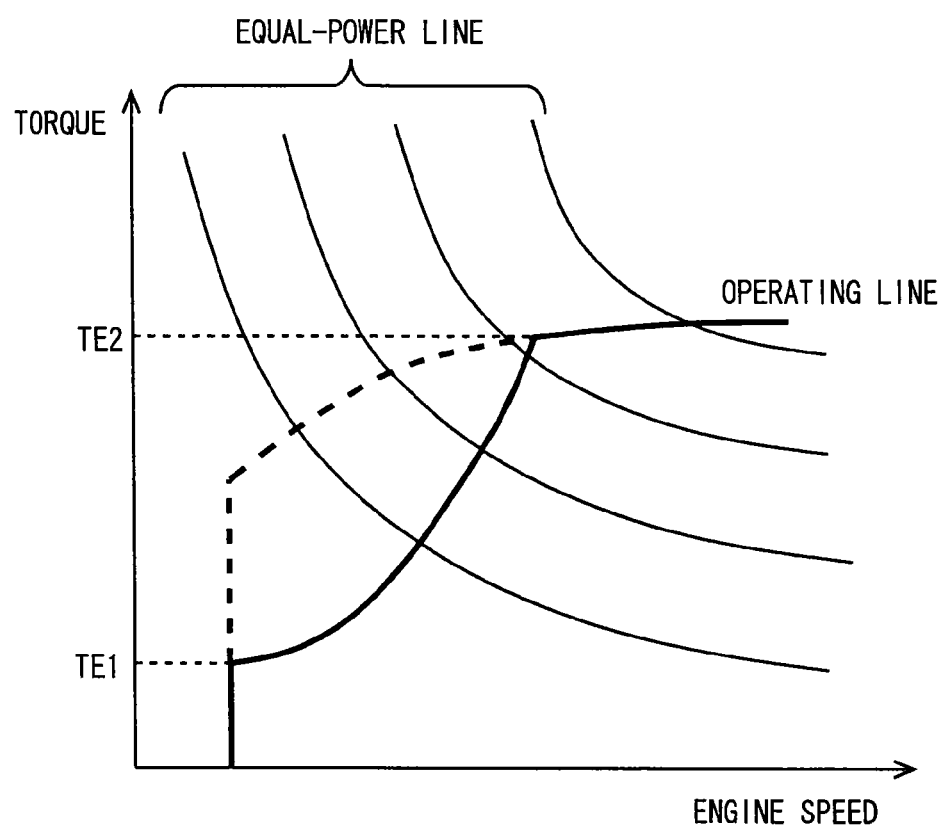
FIG. 4 shows an operating line of the engine and equal-power lines (No. 1).

As shown in FIG. 4, an operating point of engine 100, namely, an engine speed NE and output torque TE are determined by a point of intersection of the output power and an operating line.

The output power is represented by equal-power lines. The operating line is predetermined by a developer based on the results of experiments and simulations. The operating line is set so that engine 100 can be driven with optimal (highest) fuel economy. That is, the optimal fuel economy is achieved by driving engine 100 along the operating line. It is noted that in a range between a predetermined torque TE1 and a predetermined torque TE2, the operating line is set so that vibration and noise are reduced. It is noted that the way to set the operating line is not limited thereto.

Figure 5:
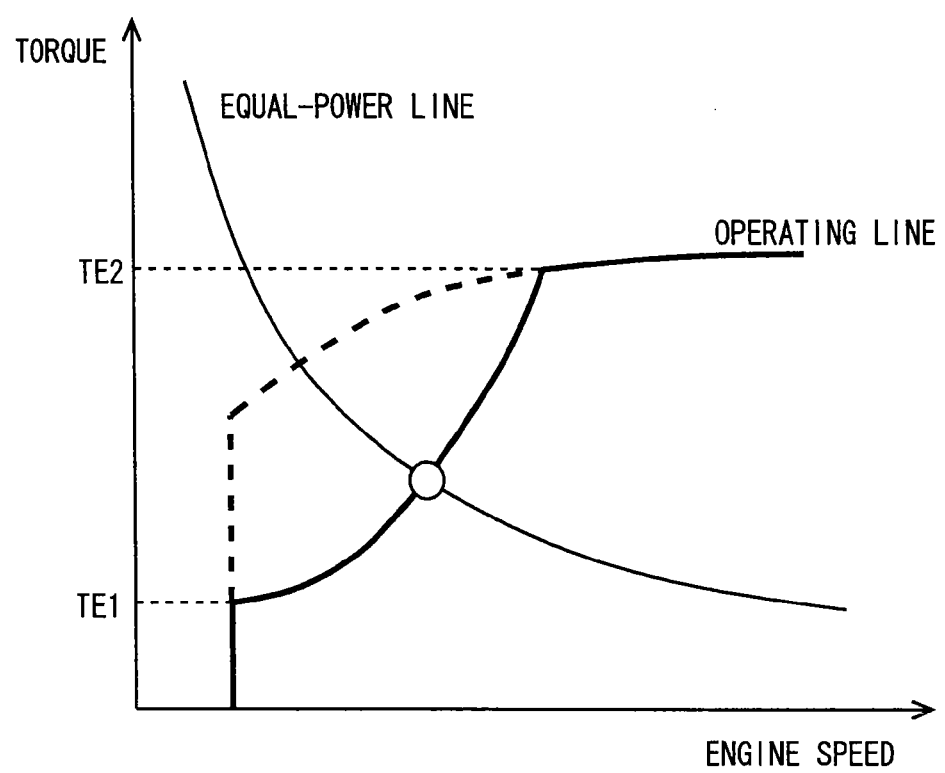
FIG. 5 shows the operating line of the engine and equal-power line (No. 2).
Figure 6:
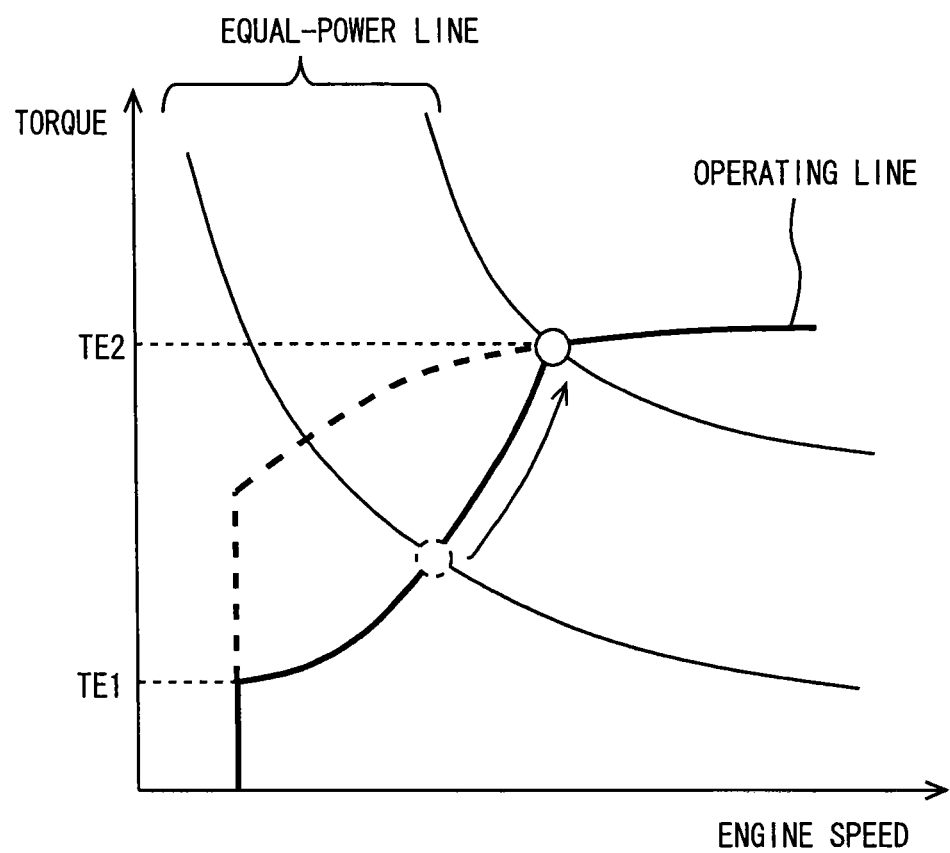
FIG. 6 shows the operating line of the engine and equal-power lines (No. 3).

When the point of intersection of the output power and the operating line is in the range between predetermined torque TE1 and predetermined torque TE2 as shown in FIG. 5, the optimal fuel economy is not achieved. In view of this, to achieve the optimal fuel economy, the output power is corrected to increase when driving engine 100, as shown in FIG. 6. Specifically, the output power is increased to achieve the optimal fuel economy.

Figure 7:
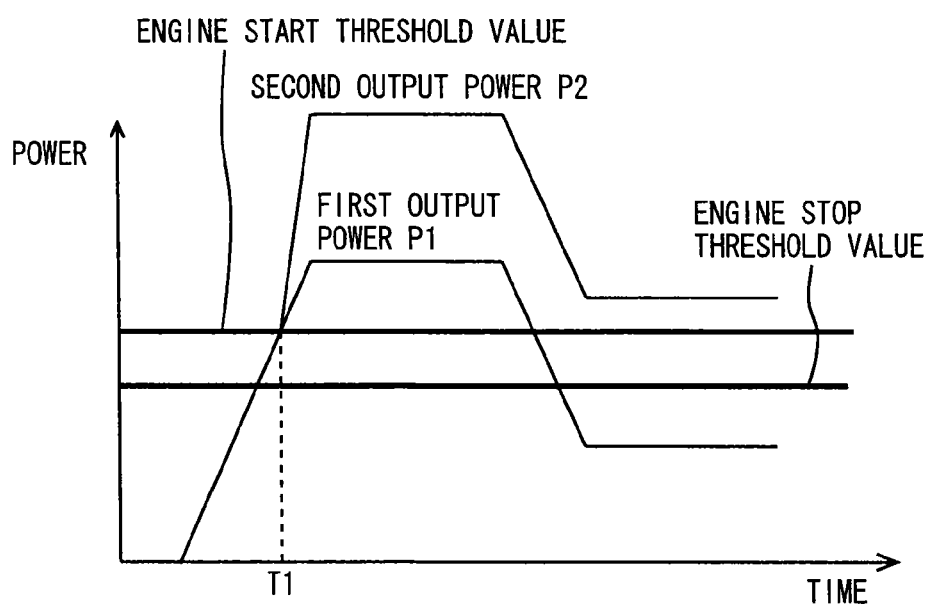
FIG. 7 shows first output power P1 set based on an accelerator position, and second output power P2 corrected to increase.

As a result, as shown in FIG. 7, after engine 100 is started at time T1, the hybrid vehicle is controlled to attain second output power P2 corrected to increase, instead of first output power P1 set based on the accelerator position. For example, the hybrid vehicle is controlled so that the output power of engine 100 is second output power P2.

The difference between first output power P1 requested by the driver and second output power P2 is used, for example, to generate electric power using first motor generator 110 to charge battery 150.

After engine 100 is started, when the output power becomes equal to or smaller than an engine stop threshold value, engine 100 is stopped. Thus, the hybrid vehicle runs using only the driving force from second motor generator 120. For example, the hybrid vehicle is controlled so that the output power of second motor generator 120 is first output power P1. The engine stop threshold value is set to be smaller than the engine start threshold value by the developer in consideration of hysteresis.

Whether to compare first output power P1 set based on the accelerator position with the engine stop threshold value, or to compare second output power P2 corrected to increase with the engine stop threshold value is switched depending on the drive state of the hybrid vehicle.

Figure 8:
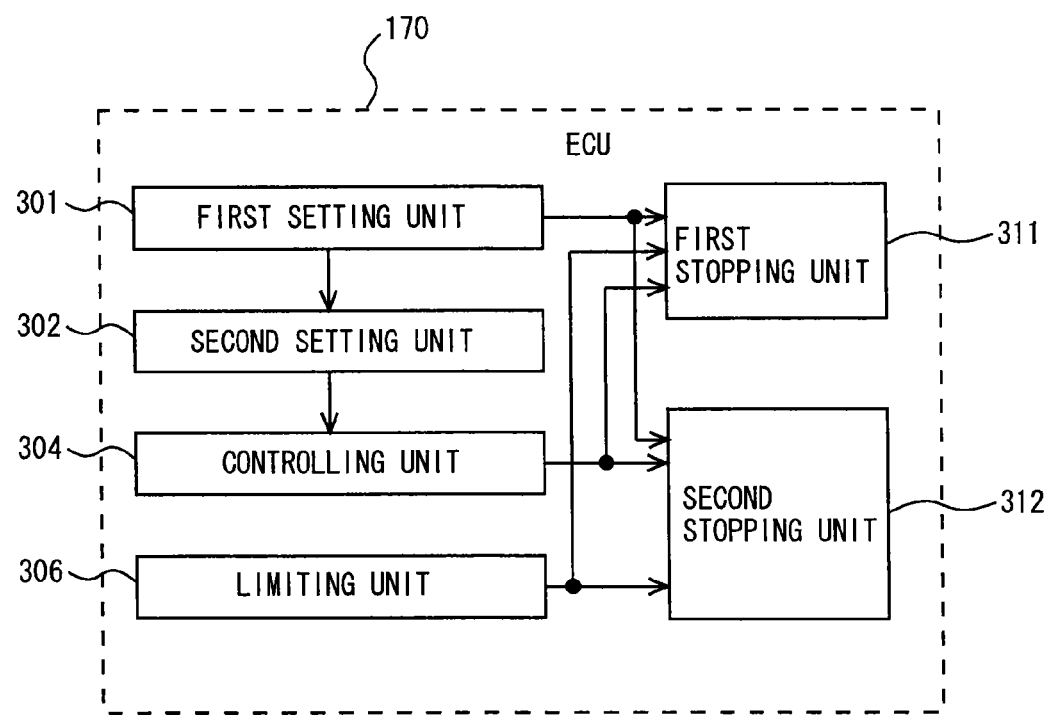
FIG. 8 is a functional block diagram of an ECU.

Referring to FIG. 8, the function of ECU 170 in this embodiment is described. The function described below may be implemented by hardware, software, or cooperation of hardware and software.

ECU 170 includes a first setting unit 301, a second setting unit 302, a controlling unit 304, a limiting unit 306, a first stopping unit 311, and a second stopping unit 312.

First setting unit 301 sets the first output power in accordance with operation on accelerator pedal 172 by the driver. For example, the first output power is set in accordance with a map having the accelerator position, vehicle speed and the like as parameters.

Second setting unit 302 sets second output power P2 greater than first output power P1. Second output power P2 is set so that engine 100 is driven at an operating point where the optimal fuel economy is achieved.

Controlling unit 304 controls engine 100 to drive in accordance with second output power P2. For example, the hybrid vehicle is controlled so that the output power of engine 100 is second output power P2.

Figure 9:
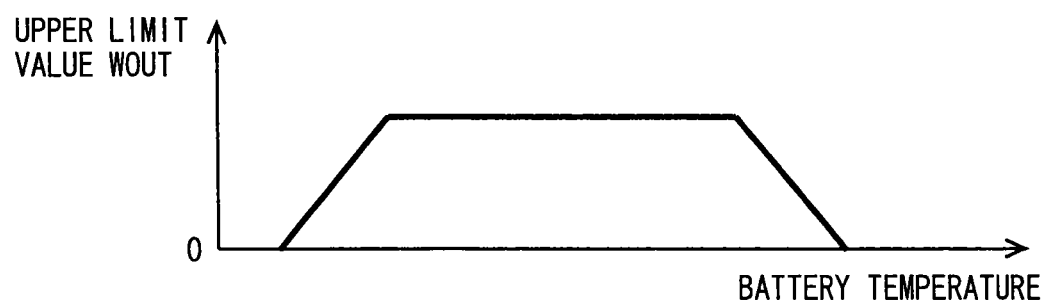
FIG. 9 shows an upper limit value WOUT of electric power discharged from a battery.

Controlling unit 306 sets, depending on the temperature of battery 150, an upper limit value WOUT of electric power discharged from battery 150. For example, upper limit value WOUT is set depending on the temperature of battery 150, based on a map shown in FIG. 9. It is noted that the way to set upper limit value WOUT of electric power discharged from battery 150 is not limited thereto. The electric power discharged from battery 150 is limited to be equal to or smaller than upper limit value WOUT.

Referring back to FIG. 8, when second output power P2 is equal to or smaller than the predetermined engine stop threshold value in a first state, first stopping unit 311 controls the hybrid vehicle so that engine 100 is stopped.

When first output power P1 is equal to or smaller than the engine threshold value in a second state different from the first state, second stopping unit 312 controls the hybrid vehicle so that engine 100 is stopped.

The first state includes a state where the SOC of battery 150 is lower than a predetermined SOC, a state where the temperature of the coolant of engine 100 is lower than a predetermined temperature, a state where upper limit value WOUT of electric power discharged from battery 150 is smaller than a predetermined value, and a state where air conditioner 104 is operating to heat the air in the vehicle interior.

Therefore, in a state where the SOC of battery 150 is lower than a predetermined SOC, a state where the temperature of the coolant of engine 100 is lower than a predetermined temperature, a state where upper limit value WOUT of electric power discharged from battery 150 is smaller than a predetermined value, or a state where air conditioner 104 is operating to heat the air in the vehicle interior, when second output power P2 is equal to or smaller than the predetermined engine stop threshold value, the hybrid vehicle is controlled so that engine 100 is stopped.

The second state is a state other than the first state. Thus, the second state satisfies at least a condition that the SOC of battery 150 is equal to or higher than the predetermined SOC. More specifically, the second state is a state where the SOC of battery 150 is equal to or higher than the predetermined SOC, the temperature of the coolant of engine 100 is equal to or higher than the predetermined temperature, upper limit value WOUT of electric power discharged from battery 150 is equal to or greater than the predetermined value, and air conditioner 104 is operating to cool the air in the vehicle interior, or is in a stopped state.

Therefore, in a state that satisfies all of the conditions that the SOC of battery 150 is equal to or higher than the predetermined SOC, the temperature of the coolant of engine 100 is equal to or higher than the predetermined temperature, upper limit value WOUT of electric power discharged from battery 150 is equal to or greater than the predetermined value, and air conditioner 104 is operating to cool the air in the vehicle interior, or is in a stopped state, when first output power P1 is equal to or smaller than the engine threshold value, the hybrid vehicle is controlled so that engine 100 is stopped.

The first and second states are not limited to these states. For example, the first state may be a state where the SOC of battery 150 is lower than the predetermined SOC, and the second state may be a state where the SOC of battery 150 is equal to or higher than the predetermined SOC.

The state where the SOC of battery 150 is lower than the predetermined SOC is a state where, in short, electric power that can be discharged from battery 150 is smaller than a prescribed value, and electric power that can be charged to battery 150 is greater than a prescribed value.

The state where the temperature of the coolant of engine 100 is equal to or lower than the predetermined temperature is a state where, in short, engine 100 needs to be warmed up.

Figure 10:
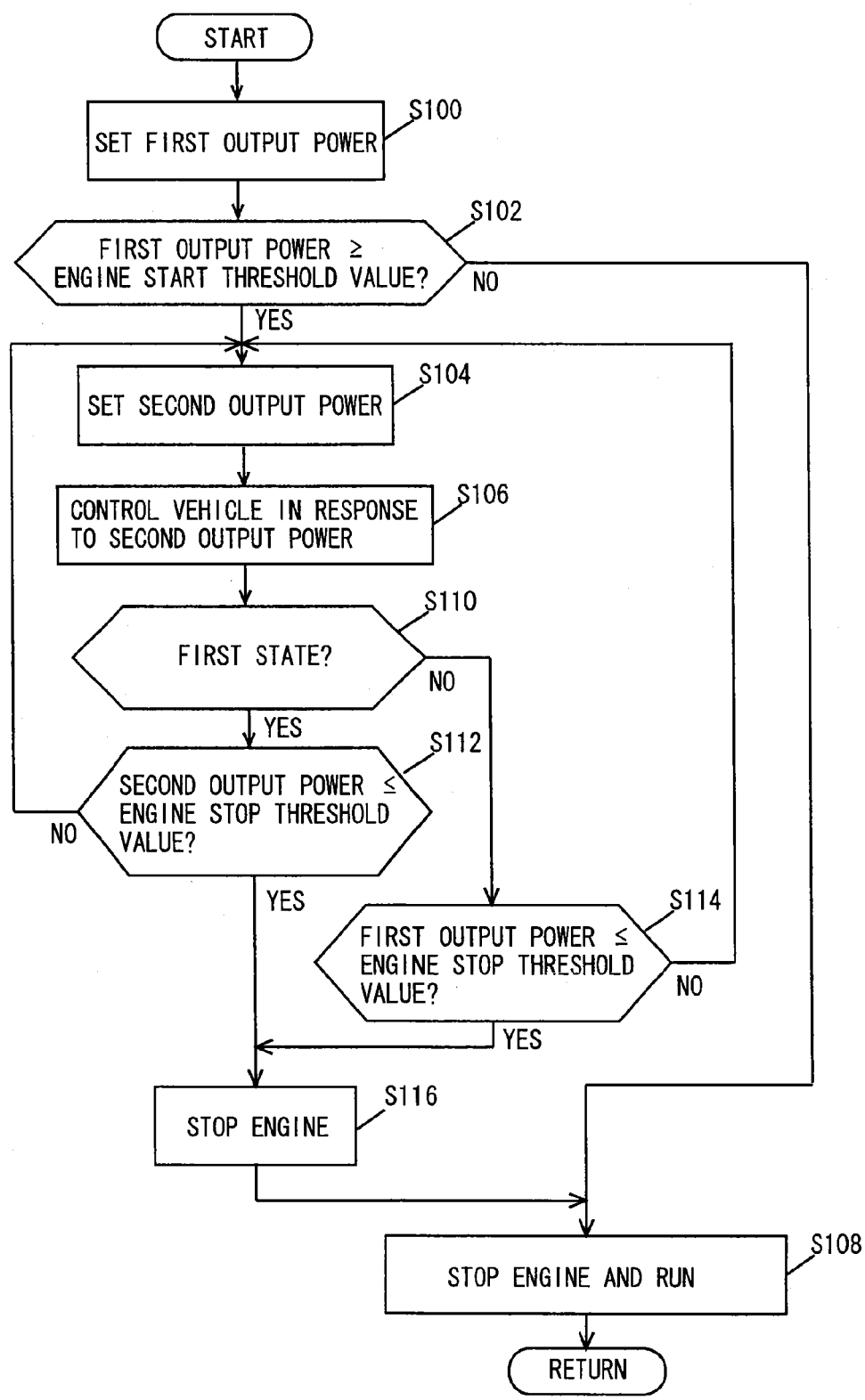
FIG. 10 is a flowchart showing a control configuration of the hybrid vehicle.

Referring to FIG. 10, a control configuration of the hybrid vehicle is described.

In step (hereinafter abbreviated as S) 100, ECU 170 sets first output power P1 in accordance with operation on accelerator pedal 172 by the driver. Namely, first output power P1 is set in accordance with the accelerator position.

In S102, ECU 170 determines whether or not first output power P1 is equal to or greater than the engine start threshold value. If first output power P1 is equal to or greater than the engine start threshold value (YES in S102), the process proceeds to S104. If not (NO in S102), the process proceeds to S108.

In S104, ECU 170 sets second output power P2 greater than first output power P1.

In S106, ECU 170 controls the hybrid vehicle so that engine 100 is driven in accordance with second output power P2.

In S108, ECU 170 controls the hybrid vehicle so that engine 100 is stopped and only second motor generator 120 is used as a driving source for running. For example, the hybrid vehicle is controlled so that the output power of second motor generator 120 is first output power P1.

In S110, ECU 170 determines whether or not the drive state of the vehicle is the first state. If the drive state of the vehicle is the first state (YES in S110), the process proceeds to S112. If the drive state of the vehicle is the second state (NO in S110), the process proceeds to S114.

In S112, ECU 170 determines whether or not second output power P2 is equal to or smaller than the engine stop threshold value. If second output power P2 is equal to or smaller than the engine stop threshold value (YES in S112), the process proceeds to S116. If not (NO in S112), the process returns to S104.

In S114, ECU 170 determines whether or not first output power P1 is equal to or smaller than the engine stop threshold value. If first output power P1 is equal to or smaller than the engine stop threshold value (YES in S114), the process proceeds to S116. If not (NO in S114), the process returns to S104.

In S116, ECU 170 stops engine 100.

As described above, according to the hybrid vehicle in this embodiment, engine 100 is controlled to be driven in accordance with second output power P2 greater than first output power P1 set in accordance with the operation on accelerator pedal 172 by the driver. When first output power P1 is equal to or smaller than the engine stop threshold value in the second state, engine 100 is stopped. First output power P1 is smaller than second output power P2. Thus, first output power P1 is more likely than second output power P2 to become equal to or smaller than the engine start threshold value. Therefore, the frequency with which engine 100 is stopped is increased.

Other Embodiments

Figure 11:
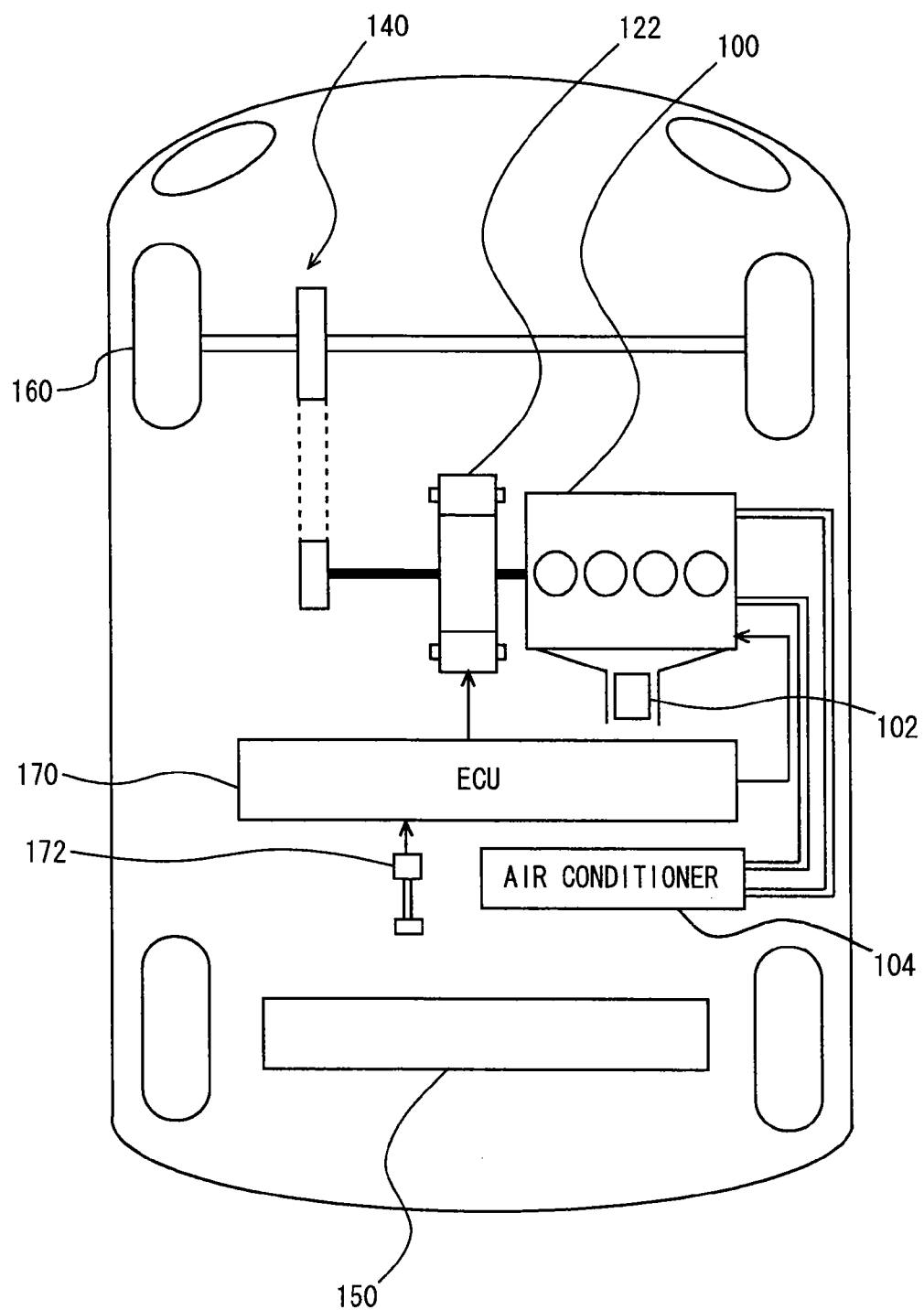
FIG. 11 is a schematic structural diagram showing a hybrid vehicle in another embodiment (No. 1).

As shown in FIG. 11, the present invention can also be applied to a hybrid vehicle incorporating only a motor generator 122 mainly used as a driving source, and not including a motor generator mainly used as a power generator.

Figure 12:
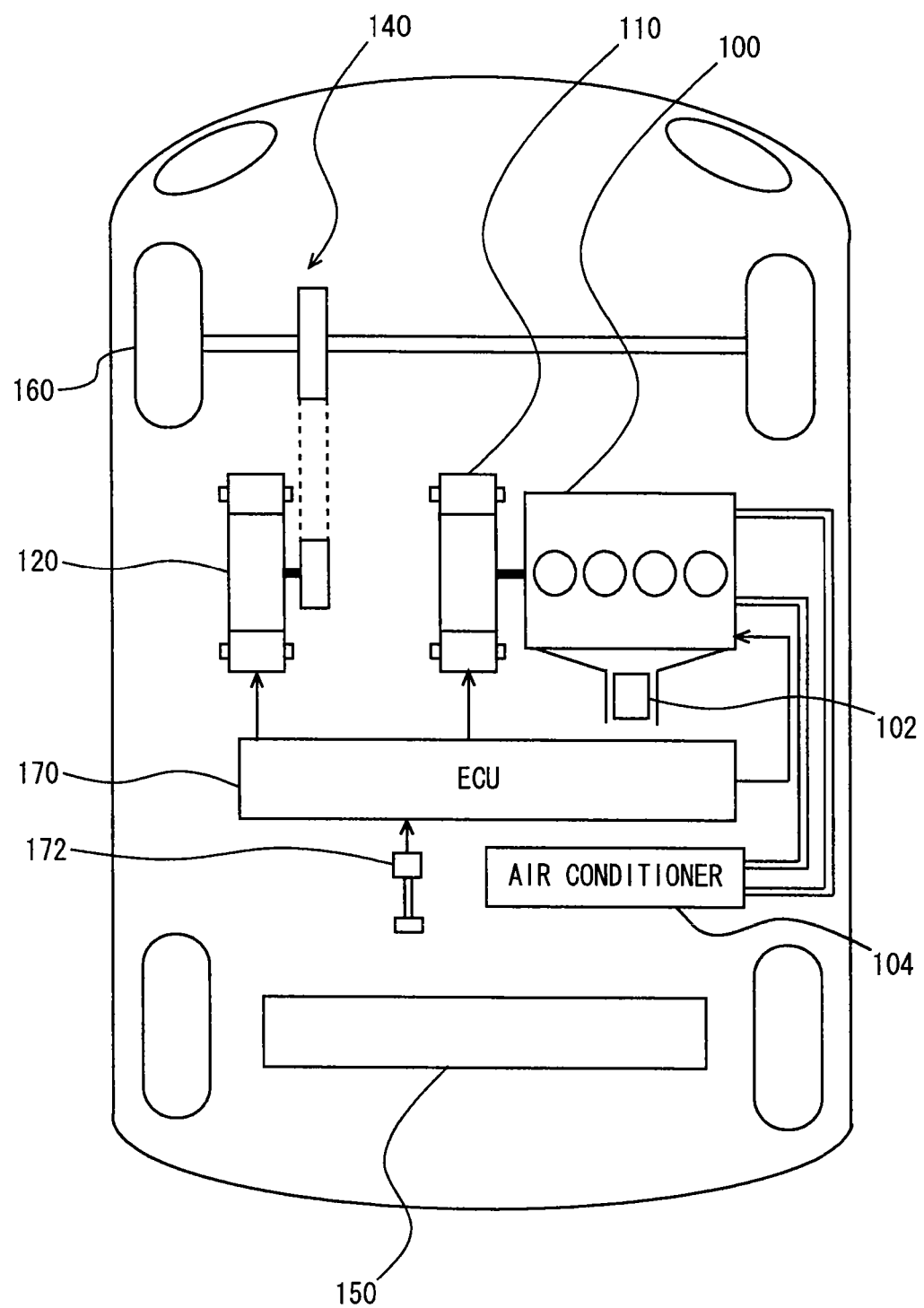
FIG. 12 is a schematic structural diagram showing a hybrid vehicle in another embodiment (No. 2).

As shown in FIG. 12, the present invention can also be applied to a series-type hybrid vehicle in which engine 100 is used only to drive first motor generator 110, and second motor generator 120 is always used for running.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100 engine; 102 catalyst; 104 air conditioner; 110 first motor generator; 120 second motor generator; 130 power split device; 140 reduction gear; 150 battery; 160 front wheel; 170 ECU; 172 accelerator pedal; 200 converter; 210 first inverter; 220 second inverter; 230 system main relay; 301 first setting unit; 302 second setting unit; 304 controlling unit; 306 limiting unit; 311 first stopping unit; 312 second stopping unit.

The invention claimed is:

1. A control device for a hybrid vehicle which includes an internal combustion engine, an electric motor, and a power storage device that stores electric power to be supplied to said electric motor, and which runs using at least one of said internal combustion engine and said electric motor, comprising:
   a first setting unit that sets first output power in accordance with operation by a driver;
   a second setting unit that sets second output power greater than said first output power;
   a controlling unit that controls said internal combustion engine to drive in accordance with said second output power;
   a first stopping unit that stops said internal combustion engine when said second output power is equal to or smaller than a predetermined threshold value in a first state; and
   a second stopping unit that stops said internal combustion engine when said first output power is equal to or smaller than said threshold value in a second state different from said first state.

2. The control device for a hybrid vehicle according to claim 1, wherein
   said first state includes a state where a state of charge of said power storage device is lower than a predetermined state of charge, and
   said second state is a state that satisfies at least a condition that the state of charge of said power storage device is equal to or higher than said predetermined state of charge.

3. The control device for a hybrid vehicle according to claim 1, wherein
   said first state includes a state where a temperature of coolant of said internal combustion engine is lower than a predetermined temperature, and
   said second state is a state that satisfies at least a condition that the temperature of the coolant of said internal combustion engine is equal to or higher than said predetermined temperature.

4. The control device for a hybrid vehicle according to claim 1, further comprising a limiting unit that sets, depending on temperature of said power storage device, an upper limit value of electric power discharged from said power storage device, wherein
   said first state includes a state where said upper limit value is smaller than a predetermined value, and
   said second state is a state that satisfies at least a condition that said upper limit value is equal to or greater than said predetermined value.

5. The control device for a hybrid vehicle according to claim 1, wherein
   said hybrid vehicle further includes an air conditioner for heating air in the vehicle interior by using coolant of said internal combustion engine,
   said first state includes a state where said air conditioner is operating to heat the air in said vehicle interior, and
   said second state is a state that satisfies at least a condition that said air conditioner is operating to cool the air in said vehicle interior, or a condition that said air conditioner is in a stopped state.

6. A control method for a hybrid vehicle which includes a control unit, an internal combustion engine, an electric motor, and a power storage device that stores electric power to be supplied to said electric motor, and which runs using at least one of said internal combustion engine and said electric motor, comprising the steps of:
   setting, using the control unit, first output power in accordance with operation by a driver;
   setting, using the control unit, second output power greater than said first output power;
   controlling, using the control unit, said internal combustion engine to drive in accordance with said second output power;
   stopping, using the control unit, said internal combustion engine when said second output power is equal to or smaller than a predetermined threshold value in a first state; and
   stopping, using the control unit, said internal combustion engine when said first output power is equal to or smaller than said threshold value in a second state different from said first state.

7. A hybrid vehicle which includes an internal combustion engine, an electric motor, and a power storage device that stores electric power to be supplied to said electric motor, and which runs using at least one of said internal combustion engine and said electric motor, comprising:
   an operation unit operated by a driver; and
   a control unit that controls said hybrid vehicle in accordance with operation on said operation unit by the driver, wherein
   said control unit sets first output power in accordance with the operation by the driver, sets second output power greater than said first output power, controls said internal combustion engine to drive in accordance with said second output power, stops said internal combustion engine when said second output power is equal to or smaller than a predetermined threshold value in a first state, and stops said internal combustion engine when said first output power is equal to or smaller than said threshold value in a second state different from said first state.

* * * * *